US012695475B2

(12) United States Patent (10) Patent No.: US 12,695,475 B2
Feilen et al. (45) Date of Patent: Jul. 28, 2026

(54) RECEIVER EQUALIZER CIRCUIT, TRANSMITTER EQUALIZER CIRCUIT, AND ELECTRONIC DEVICE

(71) Applicant: Rohde & Schwarz GmbH & Co. KG, Munich (DE)

(72) Inventors: Michael Feilen, Munich (DE); Matthias Jelen, Munich (DE); Oomke Weikert, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 300 days.

(21) Appl. No.: 18/450,650

(22) Filed: Aug. 16, 2023

(65) Prior Publication Data

US 2025/0062782 A1 Feb. 20, 2025

(51) Int. Cl.
*H04B 1/12* (2006.01)
*H04B 1/04* (2006.01)
(52) U.S. Cl.
CPC ........... *H04B 1/123* (2013.01); *H04B 1/0475* (2013.01)
(58) Field of Classification Search
CPC ..................................................... H04B 1/123
See application file for complete search history.

(56) References Cited

U.S. PATENT DOCUMENTS

| | | | |
|---|---|---|---|
| 9,634,679 B1 | 4/2017 | Stein et al. | |
| 10,389,561 B2 * | 8/2019 | Erez ...................... | H04L 27/364 |
| 2003/0072393 A1 * | 4/2003 | Gu ....................... | H04L 27/3863 |
| | | | 375/322 |
| 2004/0072547 A1 * | 4/2004 | Axness ..................... | H04L 5/06 |
| | | | 455/209 |
| 2007/0049219 A1 * | 3/2007 | Demir ................... | H03F 1/3241 |
| | | | 455/114.2 |
| 2010/0046668 A1 * | 2/2010 | Seo ........................ | H04L 27/364 |
| | | | 375/295 |
| 2013/0114762 A1 * | 5/2013 | Azadet .................. | H03F 1/3258 |
| | | | 375/296 |
| 2022/0150093 A1 * | 5/2022 | Dabak ................. | H04L 25/0272 |

* cited by examiner

*Primary Examiner* — William G Trost, IV
(74) *Attorney, Agent, or Firm* — CHRISTENSEN O'CONNOR JOHNSON KINDNESS PLLC

(57) ABSTRACT

A receiver equalizer circuit is described. The equalizer circuit includes a signal input, a first signal processing channel, a second signal processing channel, and a filter circuit. The first signal processing channel includes a first analog-to-digital converter and a first digital down-converter provided downstream of the first analog-to-digital converter. The second signal processing channel includes a second analog-to-digital converter and a second digital down-converter provided downstream of the second analog-to-digital converter. The filter circuit is connected to the signal processing channels downstream of the digital down-converters. Further, a transmitter equalizer circuit and an electronic device are described.

11 Claims, 2 Drawing Sheets

RECEIVER EQUALIZER CIRCUIT, TRANSMITTER EQUALIZER CIRCUIT, AND ELECTRONIC DEVICE

FIELD OF THE DISCLOSURE

Embodiments of the present disclosure generally relate to a receiver equalizer circuit. Embodiments of the present disclosure further relate to a transmitter equalizer circuit and to an electronic device.

BACKGROUND

In the state of the art, it is known to apply an equalization to signals processed by parallel signal processing channels in order to account for unwanted disturbances of the processed signals.

Typically, for two parallel signal processing channels, four real-valued filters are provided that each filter one of the processed signals with a sample rate corresponding to a sample rate of an analog-to-digital converter (ADC) or of a digital-to-analog converter (DAC).

Moreover, an additional radio frequency (RF) filter needs to be provided downstream of the four real-valued filters that filters an output signal of the real-valued filters at the same sample rate.

In other words, the signals are equalized at the high sample rate of the ADC or DAC, which is rather resource-intensive as the required computational power is high.

Thus, there is a need for a receiver equalizer circuit and for a transmitter equalizer circuit that allow for a more resource-efficient equalization.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a receiver equalizer circuit. In an embodiment, the receiver equalizer circuit comprises a signal input, a first signal processing channel, a second signal processing channel, and a filter circuit. The first signal processing channel and the second signal processing channel are connected to the signal input, respectively.

In some embodiments, the first signal processing channel comprises a first analog-to-digital converter and a first digital down-converter provided downstream of the first analog-to-digital converter. The first analog-to-digital converter is configured to digitize a signal processed by the first signal-processing channel, thereby obtaining a first digitized signal. The first digital down-converter is configured to down-convert the first digitized signal or a processed version of the first digitized signal, thereby obtaining a first down-converted signal.

In some embodiments, the second signal processing channel comprises a second analog-to-digital converter and a second digital down-converter provided downstream of the second analog-to-digital converter. The second analog-to-digital converter is configured to digitize a signal processed by the second signal-processing channel, thereby obtaining a second digitized signal. The second digital down-converter is configured to down-convert the second digitized signal or a processed version of the second digitized signal, thereby obtaining a second down-converted signal.

In some embodiments, the filter circuit is connected to the signal processing channels downstream of the digital down-converters.

The present disclosure is based on the idea to provide the filter circuit of the receiver equalizer circuit downstream of the digital down-converters. This way, the filter circuit does not have to operate at the high sample rate of the analog-to-digital converter (ADC), but rather at a fraction of that sample rate determined by a decimation factor of the digital down-converters.

In other words, the filter circuit of the receiver equalizer circuit according to embodiments of the present disclosure is configured to process signals having a bandwidth that corresponds to the bandwidth that is actually used downstream of the receiver equalizer circuit. This way, the computational power necessary in order to filter the signals processed by the signal processing channels is reduced considerably, which allows for saving power and/or for using more cost-efficient filter components.

Further, the additional RF filter that is necessary in the state of the art is not needed, and can be omitted, in the receiver equalizer circuit according to embodiments of the present disclosure. Thus, the power consumption and the costs of manufacturing the receiver equalizer circuit are further reduced.

According to an aspect of the present disclosure, the filter circuit, for example, is configured to equalize the first down-converted signal and the second down-converted signal. In other words, the filter circuit is configured to perform a post-equalization of the signals processed by the first signal processing channel and the second signal processing channel.

In an embodiment of the present disclosure, the filter circuit is configured to equalize the first down-converted signal and the second down-converted signal such that cross talk between the signal processing channels and/or imbalances between the signal processing channels are/is removed. Thus, unwanted disturbances of the signals processed by the signal processing channels are removed, thereby enhancing the quality of the down-converted signals for further processing downstream of the filter circuit.

According to another aspect of the present disclosure, the filter circuit, for example, comprises a first filter sub-circuit being connected to the first signal processing channel, wherein the filter circuit comprises a second filter sub-circuit being connected to the second signal processing channel. In certain embodiments, two filter sub-circuits are sufficient for equalizing the signals processed by the signal processing channels if the filter circuit is provided downstream of the digital down-converters. Thus, a more resource-efficient and more cost-effective receiver equalizer circuit is provided compared to the state of the art, which requires four filter sub-circuits for two parallel signal processing channels and an additional RF filter.

In some embodiments, the first filter sub-circuit is connected only to the first signal processing channel, but not to the second signal processing channel.

In some embodiments, the second filter sub-circuit may be connected only to the second signal processing channel, but not to the first signal processing channel.

In a further embodiment of the present disclosure, the first filter sub-circuit and the second filter sub-circuit are established as a complex-valued filter, respectively. In other words, filter coefficients of the first filter sub-circuit and of the second filter sub-circuit are complex numbers, respectively. It has turned out that no further filter sub-circuits are necessary for equalizing the down-converted signals if the first filter sub-circuit and the second filter sub-circuit are established as complex-valued filters. Thus, a more resource-efficient and more cost-effective receiver equalizer circuit is provided compared to the state of the art, which requires four filter sub-circuits for two parallel signal processing channels as well as an additional RF filter downstream of the four filter sub-circuits.

In some embodiments, the filter circuit comprises a summation circuit being connected to each of the first filter sub-circuit and the second filter sub-circuit, wherein the summation circuit is configured to superpose output signals of the filter sub-circuits. Accordingly, an output signal of the filter circuit is a superposition of the output signals of the filter sub-circuits, i.e. a superposition of the filtered down-converted signals.

In some embodiments, the output signal of the filter circuit may be forwarded to other electronic components or electronic devices for further processing, e.g. to an analysis circuit or a signal processing circuit of a measurement instrument.

A further aspect of the present disclosure provides, for example, that the first signal processing channel is configured to process an in-phase signal (I-signal), and wherein the second signal processing channel is configured to process a quadrature signal (Q-signal).

Accordingly, the receiver equalizer circuit according to some embodiments the present disclosure may be configured to equalize an in-phase and quadrature signal (IQ signal), such that cross talk between the first signal processing channel processing the I-signal and the second signal processing channel processing the Q-signal is removed.

Alternatively or additionally, the receiver equalizer circuit according to embodiments of the present disclosure may be configured to equalize an IQ signal, such that imbalances, namely IQ imbalances, between the first signal processing channel processing the I-signal and the second signal processing channel processing the Q-signal are removed.

Embodiments of the present disclosure further provide a transmitter equalizer circuit. In an embodiment, the transmitter equalizer circuit comprises a signal input, a first signal processing channel, a second signal processing channel, and a filter circuit. The filter circuit is connected to the signal input.

In some embodiments, the first signal processing channel comprises a first digital up-converter, and a first digital-to-analog converter provided downstream of the first digital up-converter. The first digital up-converter is configured to up-convert a digital signal processed by the first signal-processing channel, thereby obtaining a first up-converted signal. The first digital-to-analog converter is configured to convert the first up-converted signal or a processed version of the first up-converted signal into a first analog signal.

In some embodiments, the second signal processing channel comprises a second digital up-converter, and a second digital-to-analog converter provided downstream of the second digital up-converter. The second digital up-converter is configured to up-convert a digital signal processed by the second signal-processing channel, thereby obtaining a second up-converted signal. The second digital-to-analog converter is configured to convert the second up-converted signal or a processed version of the second up-converted signal into a second analog signal.

In some embodiments, the filter circuit is connected to the signal processing channels upstream of the digital up-converters.

These embodiments of the present disclosure are based on the idea to provide the filter circuit of the transmitter equalizer circuit upstream of the digital up-converters. This way, the filter circuit does not have to operate at the high sample rate of the digital-to-analog converter (DAC), but rather at a fraction of that sample rate determined by an interpolation factor of the digital up-converters.

In other words, the filter circuit of the transmitter equalizer circuit according to embodiments of the present disclosure is configured to process signals having a bandwidth that corresponds to the bandwidth that is actually used upstream of the transmitter equalizer circuit. This way, the computational power necessary in order to filter the signals processed by the signal processing channels is reduced considerably, which allows for saving power and/or for using more cost-efficient filter components.

Further, an additional RF filter that is necessary in the state of the art upstream of the filter circuit is not needed, and can be omitted, in the transmitter equalizer circuit according to embodiments of the present disclosure. Thus, the power consumption and the costs of manufacturing the transmitter equalizer circuit are further reduced.

In an embodiment of the present disclosure, the filter circuit is configured to pre-equalize the digital signals processed by the signal-processing channels. In other words, a signal forwarded to the signal processing channels is pre-adjusted such that unwanted disturbances are not present in output signals of the signal processing channels.

According to an aspect of the present disclosure, the filter circuit, for example, is configured to pre-equalize the digital signals processed by the signal-processing channels such that cross talk between the signal processing channels and/or imbalances between the signal processing channels are/is removed. In other words, a signal forwarded to the signal processing channels is pre-adjusted such that cross talk between the signal processing channels and/or imbalances between the signal processing channels are/is not present in output signals of the signal processing channels.

In some embodiments, the filter circuit comprises a first filter sub-circuit being connected to the first signal processing channel, and wherein the filter circuit comprises a second filter sub-circuit being connected to the second signal processing channel. It has turned out that two filter sub-circuits are sufficient for pre-equalizing the signals processed by the signal processing channels if the filter circuit is provided upstream of the digital up-converters. Thus, a more resource-efficient and more cost-effective transmitter equalizer circuit is provided compared to the state of the art, which requires four filter sub-circuits for two parallel signal processing channels as well as an RF filter upstream of the filter circuit.

In some embodiments, the first filter sub-circuit is connected only to the first signal processing channel, but not to the second signal processing channel.

In some embodiments, the second filter sub-circuit may be connected only to the second signal processing channel, but not to the first signal processing channel.

In a further embodiment of the present disclosure, the first filter sub-circuit and the second filter sub-circuit are established as a complex-valued filter, respectively. In other words, filter coefficients of the first filter sub-circuit and of the second filter sub-circuit are complex numbers, respectively. In certain embodiments, no further filter sub-circuits are necessary for pre-equalizing the signals processed by the signal processing channels if the first filter sub-circuit and the second filter sub-circuit are established as complex-valued filters. Thus, a more resource-efficient and more cost-effective transmitter equalizer circuit is provided compared to the state of the art, which requires four filter sub-circuits for two parallel signal processing channels as well as an RF filter upstream of the filter circuit.

In some embodiments, the filter circuit may comprise a splitter circuit being connected to each of the first filter sub-circuit and the second filter sub-circuit, wherein the splitter circuit is configured to forward a signal received via the signal input to the filter sub-circuits. Accordingly, an input signal received by the filter circuit is split up and forwarded to both the first signal processing channel and to the second signal processing channel.

In some embodiments, the input signal of the filter circuit may be an output signal of another electronic component or another electronic device, e.g. an output signal of an analysis circuit or of a signal processing circuit of a measurement instrument.

According to an aspect of the present disclosure, the first signal processing channel is configured, for example, to process an in-phase signal, wherein the second signal processing channel is configured, for example, to process a quadrature signal.

Accordingly, the transmitter equalizer circuit according to some embodiments the present disclosure may be configured to pre-equalize an IQ signal, such that cross talk between the first signal processing channel processing the I-signal and the second signal processing channel processing the Q-signal is removed.

Alternatively or additionally, the transmitter equalizer circuit according to embodiments of the present disclosure may be configured to pre-equalize an IQ signal, such that imbalances, namely IQ imbalances, between the first signal processing channel processing the I-signal and the second signal processing channel processing the Q-signal are removed.

Embodiments of the present disclosure further provide an electronic device. In some embodiments, the electronic device comprises a receiver equalizer circuit according to any one of the embodiments described above, and/or a transmitter equalizer circuit according to any one of the embodiments described above.

Regarding the advantages and further properties of the electronic device, reference is made to the explanations given above with respect to the receiver equalizer circuit and with respect to the transmitter equalizer circuit, which also hold for the electronic device and vice versa.

According to an aspect of the present disclosure, the electronic device, for example is established as or included in a measurement instrument. For example, the electronic device may be an oscilloscope, for example a digital oscilloscope, a signal analyzer, a spectrum analyzer, or a vector network analyzer. However, it is to be understood that the electronic device may be established as any other type of measurement instrument.

Another aspect of the present disclosure provides that the electronic device, for example, is established as a radio frequency (RF) receiver and/or as an RF transmitter. In some embodiments, the electronic device may be an RF transceiver or an RF frontend, for example an external RF frontend.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
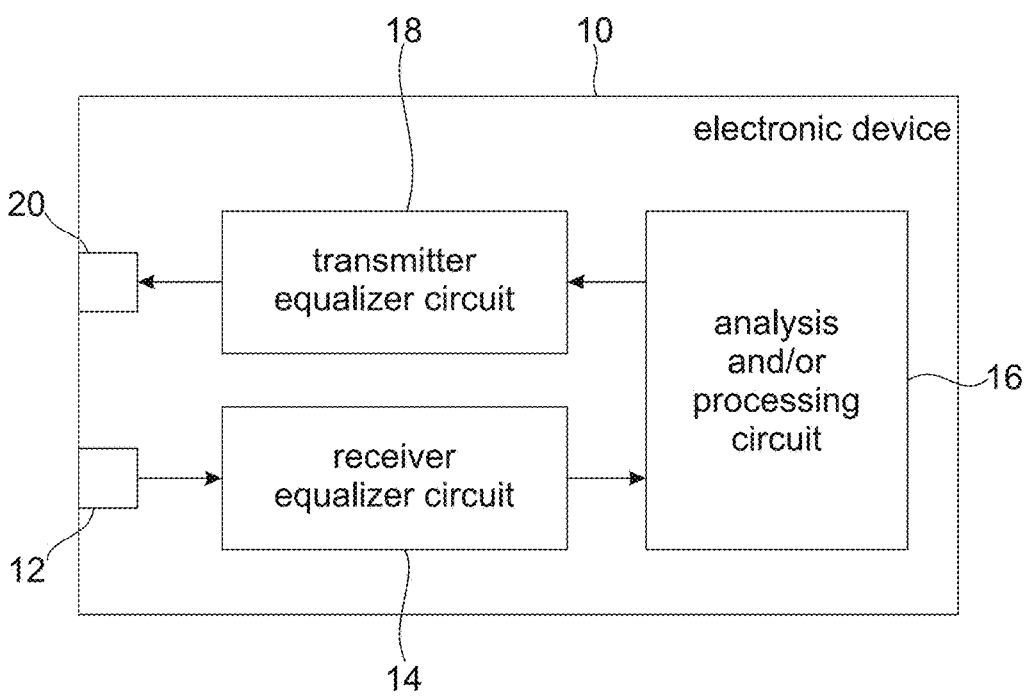
FIG. 1 schematically shows an electronic device according to an embodiment of the present disclosure.

FIG. 1 schematically shows an example of an electronic device 10. In general, the electronic device 10 is configured to receive, process, and/or transmit electric signals, for example radio frequency (RF) signals. For example, the electronic device 10 may be an oscilloscope, for example a digital oscilloscope, a signal analyzer, a spectrum analyzer, a vector network analyzer, or any other type of measurement instrument.

In other embodiments, the electronic device 10 may be an RF receiver and/or an RF transmitter. In some embodiments, the electronic device 10 may be an RF transceiver or an RF frontend, for example an external RF frontend.

In the example embodiment shown in FIG. 1, the electronic device comprises a signal input 12 and a receiver equalizer circuit 14 being connected to the signal input 12. In general, the signal input 12 is configured to receive electric signals and forward the received electric signals to the receiver equalizer circuit 14, wherein the received electric signals are analog RF signals.

For example, the signal input 12 may be connected to a device under test, such that the signal input 12 receives an output signal of the device under test. As another example, the signal input 12 may be connected to an RF antenna, such that the signal input 12 receives an electric signal generated by the RF antennas based on a wireless signal picked up by the RF antenna.

The receiver equalizer circuit 14 is configured to pre-process the signal received via the signal input 12, as will be described in more detail below. The receiver equalizer circuit 14 is further configured to, for example, forward the pre-processed signal to an analysis and/or processing circuit 16 for further processing.

The analysis and/or processing circuit 16 is configured to analyze and/or process the signal received from the receiver equalizer circuit 14, for example in order to assess the performance of a device under test. The analysis and/or processing circuit 16 further is configured to generate an output signal that is forwarded to a transmitter equalizer circuit 18.

The transmitter equalizer circuit 18 is configured to process the signal received from the analysis and/or processing circuit 16, as will be described in more detail below. The transmitter equalizer circuit 18 is connected to a signal output 20 of the electronic device 10.

For example, the signal output 20 may be connected to a device under test, such that the output signal of the transmitter equalizer circuit 18 can be transmitted to the device under test via the signal output 20. As another example, the signal output 20 may be connected to an RF antenna, such that the output signal of the transmitter equalizer circuit 18 may be converted into a wireless signal by means of the RF antenna.

Figure 2:
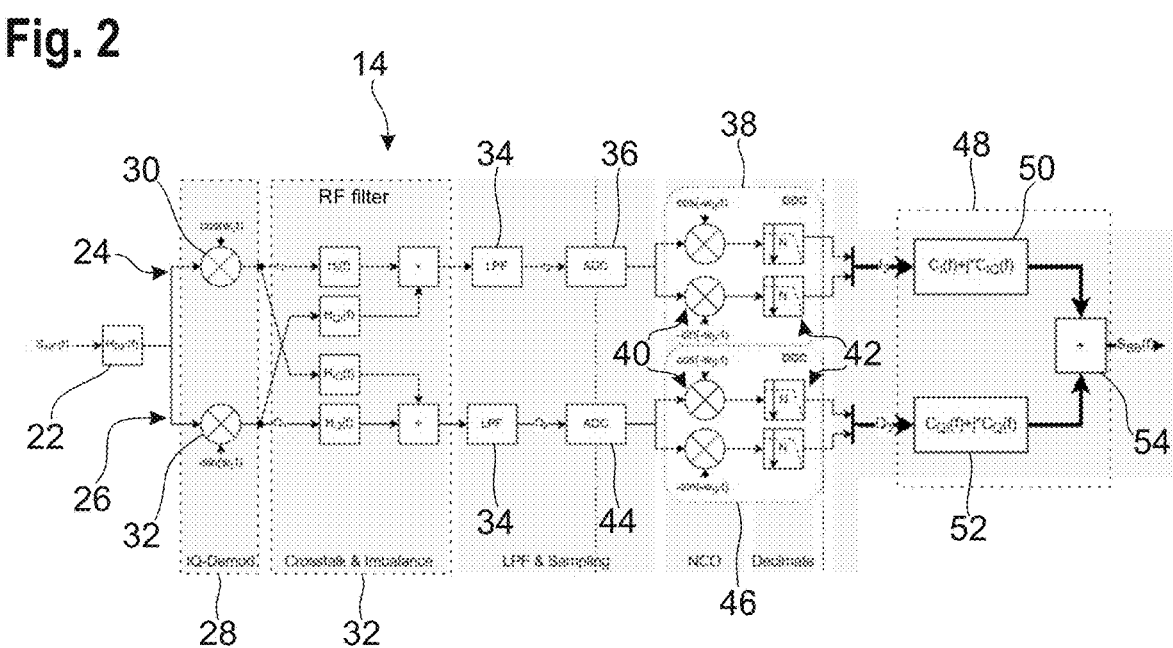
FIG. 2 schematically shows a receiver equalizer circuit according to an embodiment of the present disclosure.

FIG. 2 shows an example embodiment of the receiver equalizer circuit 14 in more detail. As shown in FIG. 2, the receiver equalizer circuit 14 comprises a signal input 22 that is configured to receive an RF signal $s_{HF}(f)$ from the signal input 12 of the electronic device 10. Without restriction of generality, it is assumed in the following that the RF signal $s_{HF}(f)$ is an analog IQ signal.

The receiver equalizer circuit 14 further comprises a first signal processing channel 24 and a second signal processing channel 26 that are connected to the signal input 22. The signal input 22 is configured to forward the RF signal to the processing channels 24, 26. As is indicated in FIG. 2, the signal input 22 may have a transfer function $H_{RF}(f)$ that alters the received RF signal according to $H_{RF}(f) \cdot s_{HF}(f)$.

In the embodiment shown, the receiver equalizer circuit 14 further comprises an IQ demodulation circuit 28 having a first IQ mixer 30 and a second IQ mixer 32. The first IQ mixer 30 is provided in the first signal processing channel 24 and is configured to multiply the RF signal $s_{HF}(f)$ with cos $(\omega_c t)$, thereby obtaining an in-phase signal $I_1$, wherein $\omega_c$ is a carrier frequency. Accordingly, the first signal processing channel 24 is configured to process the in-phase signal $I_1$.

The second IQ mixer 32 is provided in the second signal processing channel 26 and is configured to multiply the RF signal $s_{HF}(f)$ with $-\sin (\omega_c t)$, thereby obtaining a quadrature signal $Q_1$. Accordingly, the second signal processing channel 26 is configured to process the quadrature signal $Q_1$.

In the embodiment shown, the receiver equalizer circuit 14 further comprises an RF filter circuit 32 that is configured to filter the analog I-signal $I_1$ and the analog Q-signal $Q_1$ in order to at least partially remove cross talk between the signal processing channels 24, 26 and/or in order to remove imbalances between the signal processing channels 24, 26. This type of RF filter is well-known in the art and is thus not explained in further detail.

Each of the signal processing channels 24, 26 further comprises a low-pass filter 34 that is provided downstream of the RF filter circuit 32. An output signal of the low-pass filter 34 of the first signal processing channel 24 is an analog I-signal $I_2$. An output signal of the low-pass filter 34 of the second signal processing channel 26 is an analog Q-signal $I_2$.

In the embodiment shown, the first signal processing channel 24 comprises a first analog-to-digital converter (ADC) 36 downstream of the low-pass filter 34, wherein the first ADC 36 is configured to digitize the analog I-signal $I_2$, thereby obtaining a first digitized signal. In some embodiments, the first ADC 36 is configured to digitize the analog I-signal $I_2$ with a certain sample rate. For example, the sample rate may be between 5 GS/s (giga samples per second) and 50 GS/s, for example between 10 GS/s and 40 GS/s. In a certain embodiment, the sample rate may be equal to 20 GS/s.

In the embodiment shown, the first signal processing channel 24 further comprises a first digital down-converter (DDC) 38 that is configured to down-convert the first digitized signal, thereby obtaining a first down-converted signal $I_3$. In some embodiments, the first digital down-converter 38 comprises a mixer sub-circuit 40 that is configured to mix the first digitized signal with an intermediate frequency $-\omega_{IF}$. In some embodiments, the mixer sub-circuit 40 comprises a first branch that is configured to multiply the first digitized signal with cos $(-\omega_{IF} t)$ and a second branch that is configured to multiply the first digitized signal with $-\sin (-\omega_{IF} t)$.

In the embodiment shown, the digital down-converter 38 further comprises a decimation circuit 42 that is configured to decimate the first digitized signal by a decimation factor N. For example, the decimation factor N may be equal to 2, 3, 4, or any other suitable number.

Accordingly, the first down-converted signal $I_3$ has a sample rate that is equal to the sample rate of the first ADC 36 divided by the decimation factor N. For example, if the sample rate of the first ADC 36 is equal to 20 GS/s and if the decimation factor N is equal to 4, the sampling rate of the first down-converted signal $I_3$ is equal to 5 GS/s.

In the embodiment shown, the second signal processing channel 26 comprises a second ADC 44 downstream of the low-pass filter 34, wherein the second ADC 44 is configured to digitize the analog Q-signal $Q_2$, thereby obtaining a second digitized signal. In some embodiments, the second ADC 44 is configured to digitize the analog I-signal $I_2$ with a certain sample rate, for example wherein the sample rate of the second ADC 44 is equal to the sample rate of the first ADC 36.

In the embodiment shown, the second signal processing channel 26 further comprises a second digital down-converter 46 that is configured to down-convert the second digitized signal, thereby obtaining a second down-converted signal $Q_3$. Therein, the second digital down-converter 46 is configured analogously to the first digital down-converter 38 described above. Accordingly, the second down-converted signal $Q_3$ has a sample rate that is equal to the sample rate of the second ADC 44 divided by the decimation factor N.

In the embodiment shown, the receiver equalizer circuit 14 further comprises a filter circuit 48 that is provided downstream of the digital down-converters 38, 46. In certain embodiments, the filter circuit 48 comprises a first filter sub-circuit 50 that is provided in the first signal processing channel 24, and a second filter sub-circuit 52 that is provided in the second signal processing channel 26.

In the embodiment shown, the filter coefficients of the first filter sub-circuit 50 and of the second filter sub-circuit can be derived based on the following equalizer condition:

$$I_4(\omega) = \alpha \cdot \underbrace{(H_I(\omega') \cdot C_I(\omega') + H_{IQ}(\omega') \cdot C_{QI}(\omega'))}_{=1\,(EQ\,condition)} + \beta \cdot \underbrace{(H_Q(\omega') \cdot C_{QI}(\omega') + H_{QI}(\omega') \cdot C_I(\omega'))}_{=0\,(EQ\,condition)}$$

$$Q_4(\omega) = \alpha \cdot \underbrace{(H_I(\omega') \cdot C_{IQ}(\omega') + H_{IQ}(\omega') \cdot C_Q(\omega'))}_{=0\,(EQ\,condition)} + \beta \cdot \underbrace{(H_Q(\omega') \cdot C_Q(\omega') + H_{QI}(\omega') \cdot C_{IQ}(\omega'))}_{=1\,(EQ\,condition)}$$

9

The filter coefficients can be calculated according to the following equations:

$$\underbrace{\begin{bmatrix} C_I(\omega) & C_{QI}(\omega) \\ C_{IQ}(\omega) & C_Q(\omega) \end{bmatrix}}_{C(\omega)} \cdot \underbrace{\begin{bmatrix} H_I(\omega) & H_{QI}(\omega) \\ H_{IQ}(\omega) & H_Q(\omega) \end{bmatrix}}_{H(\omega)} = \begin{bmatrix} 1 & 0 \\ 0 & 1 \end{bmatrix}$$

$$C(\omega) = H^{-1}(\omega)$$

$$S_{BB}(\omega) = I_3(\omega) \cdot (C_I(\omega') + j \cdot C_{IQ}(\omega')) + Q_3(\omega) \cdot (C_{QI}(\omega') + j \cdot C_Q(\omega'))$$

Form these equations, it can be seen that two complex-valued filters are sufficient to equalize the first down-converted signal $I_3$ and the second down-converted signal $Q_3$, thereby obtaining an output signal $s_{BB}(\omega)$.

The first filter sub-circuit 50 is a complex-valued filter having filter coefficients $c_I(f)+jc_{IQ}(f)$.

The second filter sub-circuit 52 is a complex-valued filter having filter coefficients $c_{QI}(f)+jc_Q(f)$.

In general, the filter coefficients of the filter sub-circuits 50, 52 are chosen such that cross-talk between the signal processing channel 24, 26, and/or imbalances between the signal processing channels 24, 26 are removed. In other words, the filter circuit 48 is configured to post-equalize the signal processing channels 24, 26 by filtering the down-converted signals $I_3$ and $Q_3$.

In some embodiments, the filter circuit 48 further comprises a summation circuit 54 that is connected to both the first filter sub-circuit 50, and the second filter sub-circuit 52. The summation circuit 54 is configured to superpose the output signals of the filter sub-circuits 50, 52, thereby obtaining the output signal $s_{BB}(f)$ of the receiver equalizer circuit 14. In some embodiments, the output signal $s_{BB}(f)$ of the receiver equalizer circuit 14 may be a baseband signal. The output signal may be forwarded to the analysis and/or processing circuit 16 for further analysis and/or processing.

Figure 3:
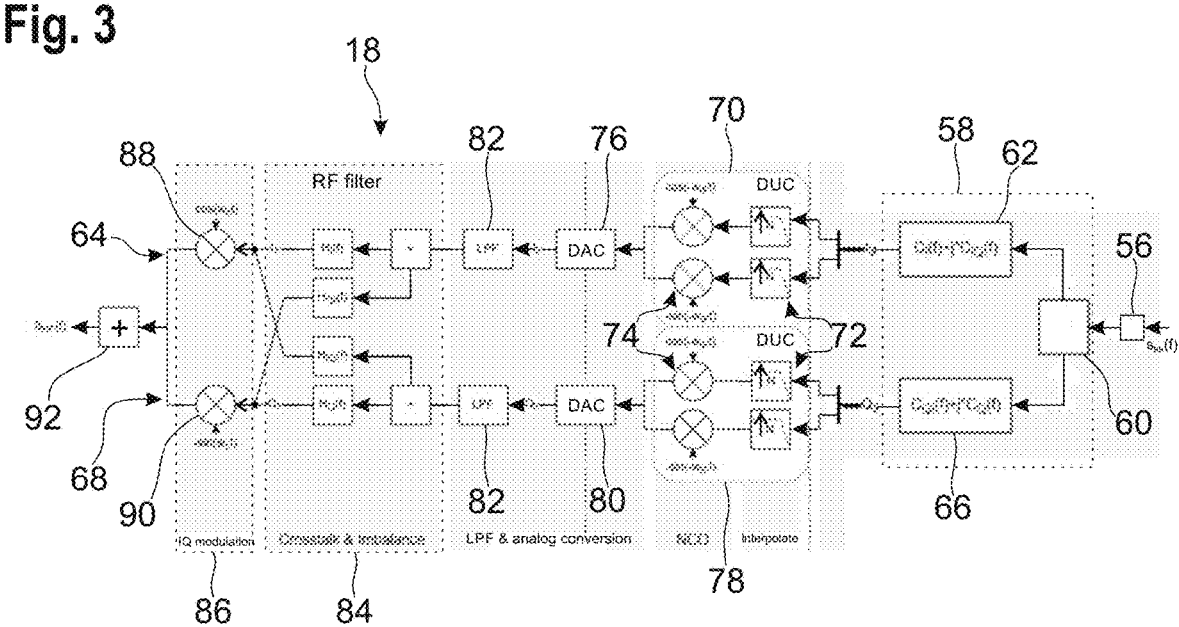
FIG. 3 schematically shows a transmitter equalizer circuit according to an embodiment of the present disclosure.

FIG. 3 shows an example embodiment of the transmitter equalizer circuit 18 in more detail. As shown in FIG. 3, the transmitter equalizer circuit 18 comprises a signal input 56 that is configured to receive a digital baseband signal $s_{BB}(f)$ from the analysis and/or processing circuit 16.

In the embodiment shown, the transmitter equalizer circuit 18 further comprises a filter circuit 58 with a splitter circuit 60 that is connected to the signal input 56 so as to receive the digital baseband signal $s_{BB}(f)$. Downstream of the splitter circuit, a first filter sub-circuit 62 is provided in a first signal processing channel 64, and a second filter sub-circuit 66 is provided in a second signal processing channel 68. Therein, the splitter circuit 60 is configured to forward the digital baseband signal $s_{BB}(f)$ to both the first filter sub-circuit 62 and the second filter sub-circuit 66.

In general, the filter circuit 58 is configured to pre-equalize digital signals processed by the signal-processing channels 64, 68 such that cross talk between the signal processing channels 64, 68 and/or imbalances, namely IQ imbalances, between the signal processing channels 64, 68 are/is removed. In some embodiments, the filter coefficients of the filter sub-circuits 62, 66 can be determined analogously to the variant described above.

In some embodiments, the first filter sub-circuit 62 is a complex-valued filter having filter coefficients $c_I(f)+jc_{IQ}(f)$. An output signal of the first filter sub-circuit 62 is a digital I-signal $I_3$.

In some embodiments, the second filter sub-circuit 66 is a complex-valued filter having filter coefficients $c_{QI}(f)+jc_Q$ (f). An output signal of the second filter sub-circuit 66 is a digital Q-signal $Q_3$.

In certain embodiments, the filter coefficients of the filter sub-circuits 62, 66 are chosen such cross-talk between the signal processing channel 64, 68, and/or imbalances namely IQ imbalances, between the signal processing channels 64, 68 are removed.

In the embodiment shown, the first signal processing channel 64 further comprises a first digital up-converter (DUC) 70 that is configured to up-convert the digital I-signal $I_3$, thereby obtaining a first up-converted signal. In some embodiments, the first digital up-converter 70 comprises an interpolation circuit 72 that is configured to interpolate the digital I-signal $I_3$ by an interpolation factor N. For example, the interpolation factor N may be equal to 2, 3, 4, or any other suitable number.

In the embodiment shown, the first digital up-converter 70 comprises a mixer sub-circuit 74 that is configured to mix the first up-converted signal with an intermediate frequency $-\omega_{IF}$. In some embodiments, the mixer sub-circuit 74 comprises a first branch that is configured to multiply the first up-converted signal with cos $(-\omega_{IF}t)$ and a second branch that is configured to multiply the first up-converted signal with $-\sin(-\omega_{IF}t)$.

In the embodiment shown, the first signal processing channel 64 further comprises a first digital-to-analog converter (DAC) 76 that is configured to convert the first up-converted signal into a first analog signal $I_2$ with a certain sample rate. For example, the sample rate may be between 5 GS/s and 50 GS/s, for example between 10 GS/s and 40 GS/s. In a certain embodiment, the sample rate may be equal to 20 GS/s.

In some embodiments, the sample rate of the first digital-to-analog converter 76 is equal to the sample rate of the baseband signal $s_{BB}(f)$ multiplied by the interpolation factor N. For example, if the sample rate of the baseband signal $s_{BB}(f)$ is equal to 5 GS/s, and if the interpolation factor N is equal to 4, then the sample rate of the first digital-to-analog converter 76 is equal to 20 GS/s.

In the embodiment shown, the second signal processing channel 68 further comprises a second digital up-converter (DUC) 78 that is configured to up-convert the digital Q-signal $Q_3$, thereby obtaining a second up-converted signal. In some embodiments, the second digital up-converter 78 comprises an interpolation circuit 72 that is configured to interpolate the digital Q-signal $Q_3$ by an interpolation factor N. For example, the interpolation factor N may be equal to 2, 3, 4, or any other suitable number.

In the embodiment shown, the second digital up-converter 78 further comprises a mixer sub-circuit 74 that is configured to mix the second up-converted signal with an intermediate frequency $-\omega_{IF}$. In some embodiments, the mixer sub-circuit 74 comprises a first branch that is configured to multiply the second up-converted signal with cos $(-\omega_{IF}t)$ and a second branch that is configured to multiply the second up-converted signal with $-\sin(-\omega_{IF}t)$.

In some embodiments, the second signal processing channel 68 further comprises a second digital-to-analog converter (DAC) 80 that is configured to convert the second up-converted signal into a second analog signal $Q_2$ with a certain sample rate. Therein, the sample rate of the second digital-to-analog converter 80 may be equal to the sample rate of the first digital-to-analog converter 76.

In some embodiments, the signal processing channels 64, 68 each comprise a low-pass filter 82 that is provided downstream of the respective digital-to-analog converter 76, 80.

In the embodiment shown, the transmitter equalizer circuit 18 further comprises an RF filter circuit 84 that is provided downstream of the low-pass filters 82. This type of RF filter is well-known in the art and is thus not explained in further detail.

Downstream of the RF filter circuit 84, an IQ modulation circuit 86 having a first IQ mixer 88 and a second IQ mixer 90 is provided. The first IQ mixer 88 is provided in the first signal processing channel 64 and is configured to multiply an output signal $I_1$ of the RF filter circuit 84 with cos $(\omega_c t)$, wherein $\omega_c$ is a carrier frequency. The second IQ mixer 90 is provided in the second signal processing channel 68 and is configured to multiply an output signal $Q_1$ of the RF filter circuit 84 with $-\sin (\omega_c t)$.

In the embodiment shown, the transmitter equalizer circuit 18 further comprises a summation circuit 92 downstream of the IQ modulation circuit 86. In some embodiments, the summation circuit 92 is configured to superpose output signals of the IQ mixers 88, 90, thereby obtaining an RF output signal $s_{HF}(f)$. The RF output signal $s_{HF}(f)$ may be forwarded to the signal output 20 of the electronic device 10.

Certain embodiments disclosed herein include components, such as the electronic device 10, receiver equalizer circuit 14, the transmitter equalizer circuit 18, and/or subcomponents thereof, etc., that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A transmitter equalizer circuit, comprising:
a signal input, a first signal processing channel, a second signal processing channel, and a filter circuit, wherein the filter circuit is connected to the signal input,
the first signal processing channel comprising a first digital up-converter, and a first digital-to-analog converter provided downstream of the first digital up-converter, wherein the first digital up-converter is configured to up-convert a digital signal processed by the first signal-processing channel, thereby obtaining a first up-converted signal having a higher sample rate than the digital signal processed by the first signal-processing channel, and wherein the first digital-to-analog converter is configured to convert the first up-converted signal or a processed version of the first up-converted signal into a first analog signal,
the second signal processing channel comprising a second digital up-converter, and a second digital-to-analog converter provided downstream of the second digital up-converter, wherein the second digital up-converter is configured to up-convert a digital signal processed by the second signal-processing channel, thereby obtaining a second up-converted signal having a higher sample rate than the digital signal processed by the first signal-processing channel, and wherein the second digital-to-analog converter is configured to convert the second up-converted signal or a processed version of the second up-converted signal into a second analog signal, and
wherein the filter circuit is connected to the signal processing channels upstream of the digital up-converters.

2. The transmitter equalizer circuit of claim 1, wherein the filter circuit is configured to pre-equalize the digital signals processed by the signal-processing channels.

3. The transmitter equalizer circuit of claim 2, wherein the filter circuit is configured to pre-equalize the digital signals processed by the signal-processing channels such that cross talk between the signal processing channels and/or imbalances between the signal processing channels are/is removed.

4. The transmitter equalizer circuit of claim 1, wherein the filter circuit comprises a first filter sub-circuit being connected to the first signal processing channel, and wherein the filter circuit comprises a second filter sub-circuit being connected to the second signal processing channel.

5. The transmitter equalizer circuit of claim 4, wherein the first filter sub-circuit and the second filter sub-circuit are established as a complex-valued filter, respectively.

6. The transmitter equalizer circuit of claim 4, wherein the filter circuit comprises a splitter circuit being connected to each of the first filter sub-circuit and the second filter sub-circuit, wherein the splitter circuit is configured to forward a signal received via the signal input to the filter sub-circuits.

7. The transmitter equalizer circuit of claim 1, wherein the first signal processing channel is configured to process an in-phase signal, and wherein the second signal processing channel is configured to process a quadrature signal.

8. An electronic device, the electronic device comprising a transmitter equalizer circuit according to claim 1.

9. The electronic device of claim 8, wherein the electronic device is established as a measurement instrument.

10. The electronic device of claim 8, wherein the electronic device is established as a radio frequency (RF) receiver and/or as an RF transmitter.

11. The transmitter equalizer circuit of claim 1, wherein the first digital up-converter is configured to interpolate the digital signal processed by the first signal-processing channel by an interpolation factor to increase the sample rate of the digital signal processed by the first signal-processing channel, and
wherein the second digital up-converter is configured to interpolate the digital signal processed by the second signal-processing channel by the interpolation factor to increase the sample rate of the digital signal processed by the second signal-processing channel.

* * * * *